(12) United States Patent  
Williamson

(10) Patent No.: US 8,037,303 B2  
(45) Date of Patent: Oct. 11, 2011

(54) SYSTEM AND METHOD FOR PROVIDING SECURE MULTICASTING ACROSS VIRTUAL PRIVATE NETWORKS

(75) Inventor: Gary Beau Williamson, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 1096 days.

(21) Appl. No.: 11/374,645

(22) Filed: Mar. 13, 2006

(65) Prior Publication Data

US 2007/0214359 A1 Sep. 13, 2007

(51) Int. Cl.
*H04L 29/06* (2006.01)
*H04L 29/00* (2006.01)
*H04L 29/02* (2006.01)
*H04L 29/04* (2006.01)

(52) U.S. Cl. ........ 713/163; 713/162; 713/150; 709/245; 370/474; 370/475

(58) Field of Classification Search .................. None
See application file for complete search history.

(56) References Cited

U.S. PATENT DOCUMENTS

| | | | |
|---|---|---|---|
| 5,973,724 A | 10/1999 | Riddle | |
| 6,112,251 A | 8/2000 | Rijhsinghani | 709/249 |
| 6,728,777 B1 | 4/2004 | Lee et al. | 709/238 |
| 6,850,707 B1* | 2/2005 | Chang et al. | 398/51 |
| 6,947,419 B2 | 9/2005 | Liu et al. | 370/390 |
| 6,970,459 B1 | 11/2005 | Meier | |
| 6,993,595 B1 | 1/2006 | Luptowski et al. | |
| 7,155,518 B2 | 12/2006 | Forslow | |
| 7,471,678 B2 | 12/2008 | Lee et al. | |
| 7,724,732 B2* | 5/2010 | Guichard et al. | 370/389 |
| 7,746,859 B2* | 6/2010 | Bi | 370/390 |
| 2002/0010679 A1* | 1/2002 | Felsher | 705/51 |
| 2003/0046425 A1 | 3/2003 | Lee | |
| 2003/0117678 A1* | 6/2003 | Chang et al. | 359/157 |
| 2003/0163690 A1* | 8/2003 | Stewart | 713/163 |
| 2004/0215799 A1* | 10/2004 | Lehmann et al. | 709/230 |
| 2004/0223464 A1* | 11/2004 | Dye et al. | 370/260 |
| 2005/0021825 A1 | 1/2005 | Kishore et al. | 709/232 |
| 2005/0027782 A1 | 2/2005 | Jalan et al. | 709/200 |
| 2006/0034202 A1* | 2/2006 | Kuure et al. | 370/312 |
| 2006/0198368 A1 | 9/2006 | Guichard et al. | |
| 2006/0221962 A1 | 10/2006 | Previdi et al. | |
| 2007/0016663 A1* | 1/2007 | Weis | 709/223 |
| 2007/0086458 A1 | 4/2007 | Narayanan et al. | |
| 2008/0072035 A1* | 3/2008 | Johnson et al. | 713/153 |
| 2008/0133913 A1* | 6/2008 | Heelan et al. | 713/168 |

(Continued)

OTHER PUBLICATIONS

Juan-Mariano de Goyeneche "Multicast over TCP/IP HOWTO," (various chapters) at http://tldp.org/HOWTO/Multicast-HOWTO.html, Mar. 20, 1998, 14 pages, Mar. 20, 1998.

(Continued)

*Primary Examiner* — Syed A. Zia
(74) *Attorney, Agent, or Firm* — Baker Botts

(57) ABSTRACT

A method is provided for securely transmitting multicast data across an unsecured public network. Such a method includes receiving a join message identifying at least one private multicast group; mapping the private multicast group to a public multicast group; generating a membership report specifying the public multicast group; and sending the membership report to the unsecured network. Additionally, the method may further comprise creating a secure tunnel through the unsecured network to a network element coupled; generating an encrypted control message specifying the private multicast group; and sending the encrypted control message through the secure tunnel to the network element.

20 Claims, 11 Drawing Sheets

U.S. PATENT DOCUMENTS

2009/0016347 A1* 1/2009 Lehmann et al. ............ 370/390

OTHER PUBLICATIONS

"Internetworking Technologies Handbook—Chapter 43," *Cisco Systems, Inc.*, at http://www.cisco.com/univercd/cc/td/doc/cisintwk/ito_doc/index.htm (with PDF link), posted Feb. 20, 2002, 16 pages, Feb. 20, 2002.

Rosen et al., "Multicast in MPLS/BGP IP VPNs," draft-rosen-vpn-mcast-08.txt, Network Working Group Internet Draft, *Internet Engineering Task Force (IETF)*, Dec. 2004, pp. 1-22, Dec. 2004.

Rosen et al., "Multicast in MPLS/BGP IP VPNs," draft-ietf-l3vpn-2547bis-mcast-01.txt, Network Working Group Internet Draft, *Internet Engineering Task Force (IETF)* at http://www.ietf.org/internet-drafts/draft-ietf-l3vpn-2547bis-mcast-01.txt, Dec. 2005, pp. 1-57, Dec. 2005.

USPTO Office Action dated Nov. 7, 2008 for U.S. Appl. No. 11/374,352, in the name of Gary Beau Williamson, 24 pages, Nov. 7, 2008.

USPTO Office Action dated Jun. 11, 2009 for U.S. Appl. No. 11/374,352, in the name of Gary Beau Williamson, 21 pages, Jun. 11, 2009.

U.S. Appl. No. 11/374,352 entitled "*System and Method for Providing Packet Proxy Services Across Virtual Private Networks*", 29 pages Specification, Claims, and Abstract, 11 pages of Drawings, inventor Gary Beau Williamson, Mar. 13, 2006.

USPTO Advisory Action dated Aug. 25, 2009 for U.S. Appl. No. 11/374,352, in the name of Gary Beau Williamson, 3 pages, Aug. 25, 2009.

USPTO Office Action dated Jan. 20, 2010 for U.S. Appl. No. 11/374,352, in the name of Gary Beau Williamson, 23 pages, Jan. 20, 2010.

USPTO Final Office Action dated Jul. 8, 2010 for U.S. Appl. No. 11/374,352, in the name of Gary Beau Williamson, 23 pages, Jul. 8, 2010.

* cited by examiner

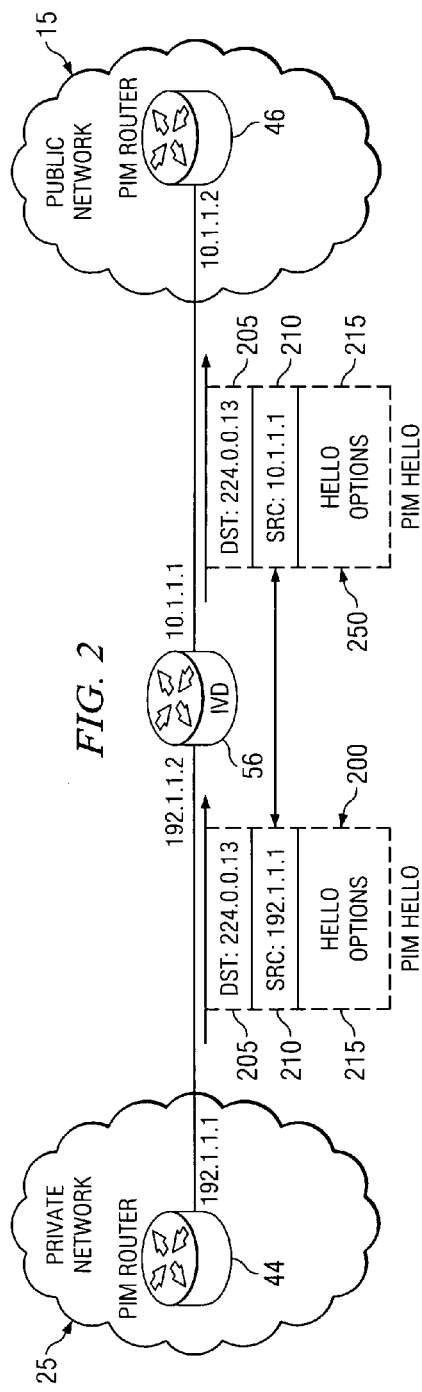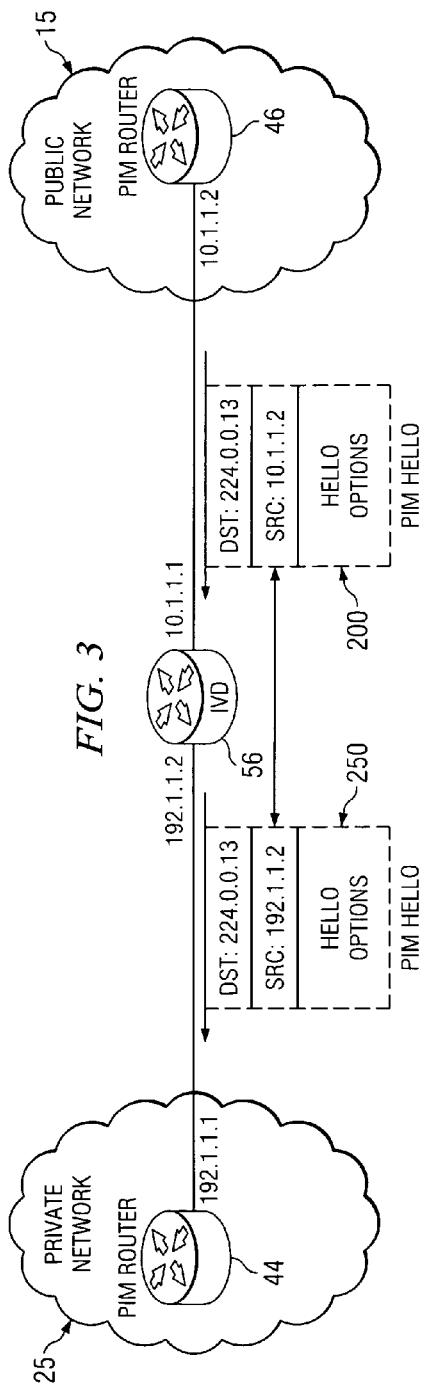

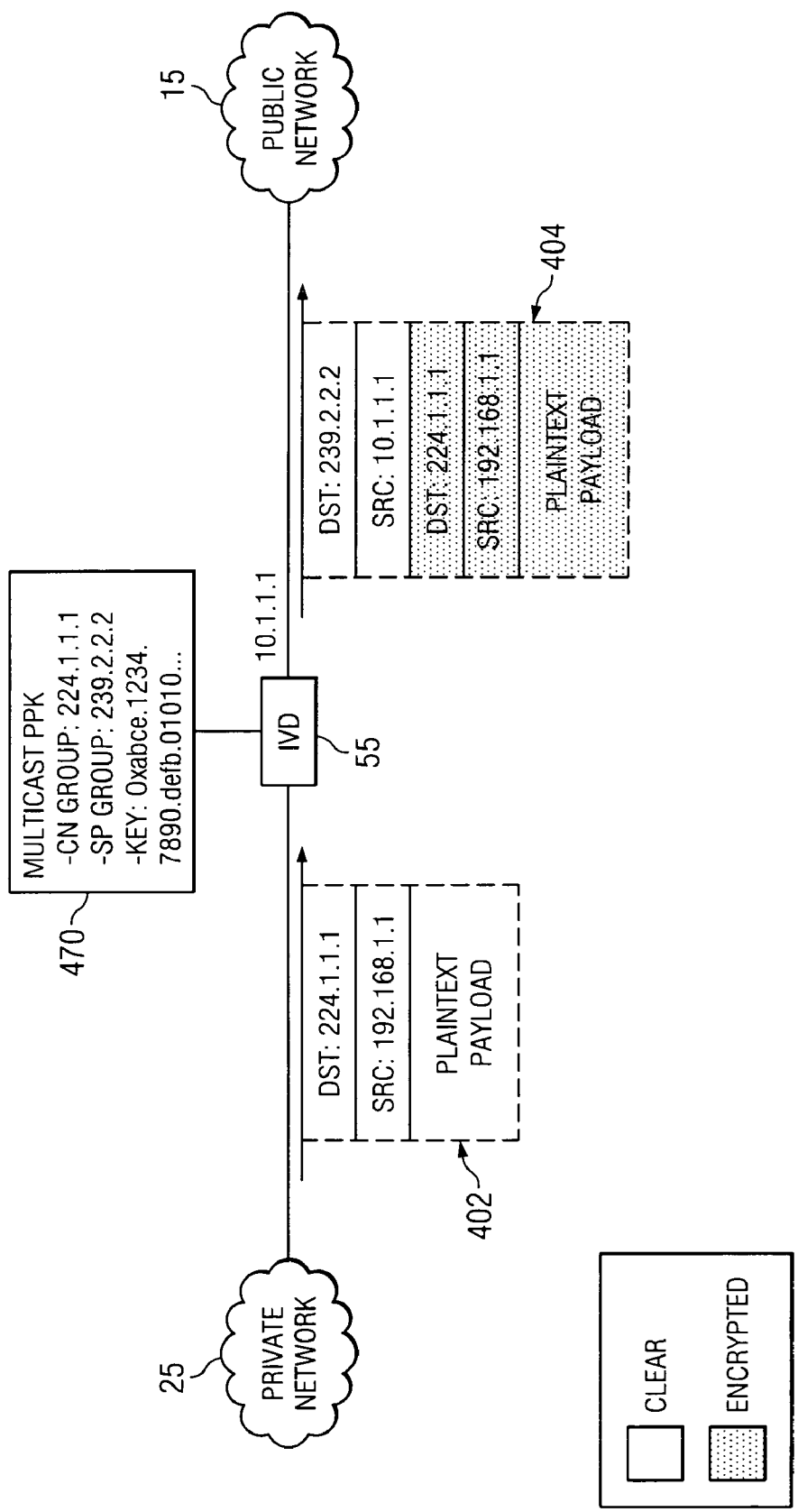

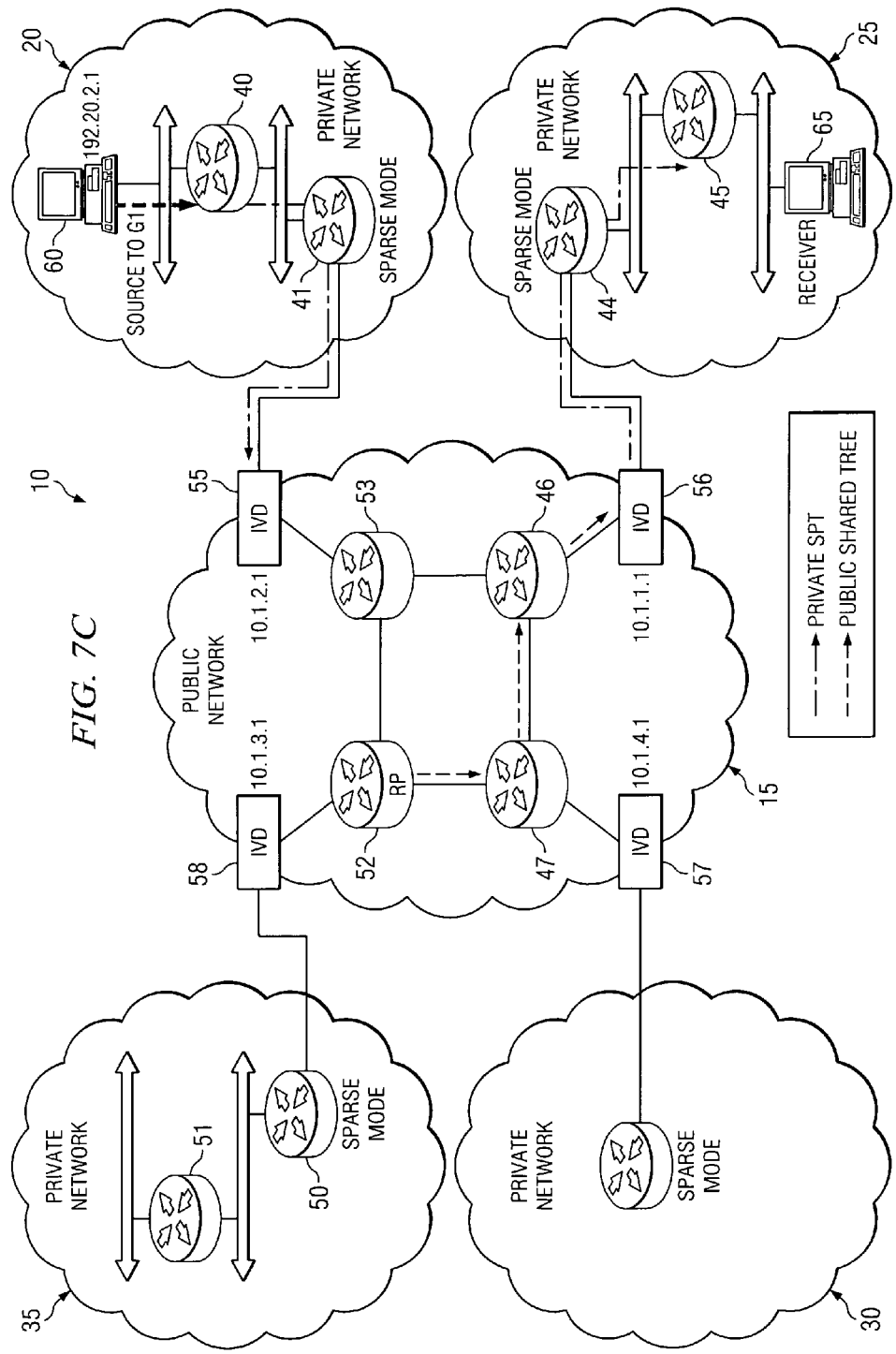

SYSTEM AND METHOD FOR PROVIDING SECURE MULTICASTING ACROSS VIRTUAL PRIVATE NETWORKS

TECHNICAL FIELD OF THE INVENTION

This invention relates in general to the field of communications, and more particularly to a system and method for providing secure multicasting across virtual private networks.

BACKGROUND OF THE INVENTION

Current solutions to providing multicast across virtual private network (VPN) services typically requires that public network edge routers exchange routing and control traffic packets relating to the private networks behind them. Control packets sent across the public network are unsecured by any form of encryption and contain multicast distribution "join" messages for specific multicast sources behind other edge routers. Since these control packets are unencumbered by complex encryption protocols, some degree of traffic analysis can be performed by unauthorized persons that are able to intercept these control packets as they transverse the public network. While this normally is not a problem for most commercial multicast applications, it can pose a risk for more sensitive applications. Thus, current multicast VPN technologies cannot be used in sensitive networks where all control traffic relating to the private network must be secured.

SUMMARY OF THE INVENTION

In accordance with some of the teachings of the present invention, the disadvantages and problems associated with providing secure multicast across virtual private networks have been substantially reduced or eliminated. In particular, the present invention allows multicast technology to operate in a virtual private network independently of multicast technology in a public network, while preventing any visibility of private network information in the public network.

In accordance with one embodiment of the present invention, a method is provided for securely transmitting multicast data across an unsecured public network. Such a method includes receiving a join message identifying at least one private multicast group; mapping the private multicast group to a public multicast group; generating a membership report specifying the public multicast group; and sending the membership report to the unsecured network. Additionally, the method may further comprise creating a secure tunnel through the unsecured network to a network element coupled; generating an encrypted control message specifying the private multicast group; and sending the encrypted control message through the secure tunnel to the network element.

In accordance with another embodiment of the present invention, a system is provided for securely transmitting multicast data across an unsecured public network. Such a system may comprise a first encryptor network element coupled; and a second encryptor network element; wherein the first encryptor network element is operable to receive a join message from a first network element, the join message identifying at least one private multicast group, map the private multicast group to a public multicast group, generate a membership report specifying the public multicast group; send the membership report to the public network; create a secure tunnel to the second encryptor network element; generate an encrypted control message specifying the private multicast group; and send the encrypted control message through the secure tunnel to the second encryptor network element. The second encryptor network element may be operable to receive the encrypted control message from the secure tunnel; decrypt the encrypted control message; and send the decrypted control message to a third network element coupled to the second encryptor element.

In accordance with yet another embodiment of the present invention, apparatus is provided for securely transmitting multicast data across a public network. Such an apparatus may comprise means for receiving a join message identifying at least one private multicast group; means for mapping the private multicast group to a public multicast group; means for generating a membership report specifying the public multicast group; and means for sending the membership report to the public network. Additionally, such an apparatus may further comprise means for sending an encrypted control message through a secure tunnel, wherein the encrypted control message identifies the private multicast group.

Important technical advantages of certain embodiments of the present invention include preventing unauthorized analysis of multicast traffic passing through an unsecured network, while eliminating the need to maintain complex forwarding state information on the encryptor network elements. Instead, control messages arriving from a private network are encrypted and tunneled to a remote private network, which also permits efficient multicast tree building across the private networks.

From another perspective, particular embodiments of the present invention may securely tunnel control messages in encrypted multicast tunnels to other edge devices connected to a public network. At the same time, the present invention may act as a receiver to the public network by sending join messages as necessary to build multicast distribution trees in the public network. Simultaneously, certain embodiments may also act as a proxy source by sending encrypted multicast traffic into the public network.

Moreover, certain embodiments of the invention may operate as a simple "bump-in-the-wire" without the significant added complexity of performing the functions of a multicast router while simultaneously maintaining complex multicast forwarding state. Such an aspect of the invention significantly reduces the processing requirements of devices, which in turn reduces power requirements. Reduced processing and power requirements allow devices to be manufactured at a lower cost and have a smaller physical footprint.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 is a simplified block diagram of an embodiment of the present invention in which a network element is acting as a proxy for discovery packets;

FIG. 3 is a simplified block diagram of an embodiment of the present invention in which a network element is acting as a proxy for discovery packets;

FIG. 4-B is a simplified block diagram of an embodiment of the present invention in which a network element is acting as a proxy receiver;

FIGS. 7A-7E are simplified block diagrams that collectively illustrate an exemplary communication flow in which some features of the present invention are embodied in encryptor elements.

DETAILED DESCRIPTION OF THE INVENTION

Figure 1:
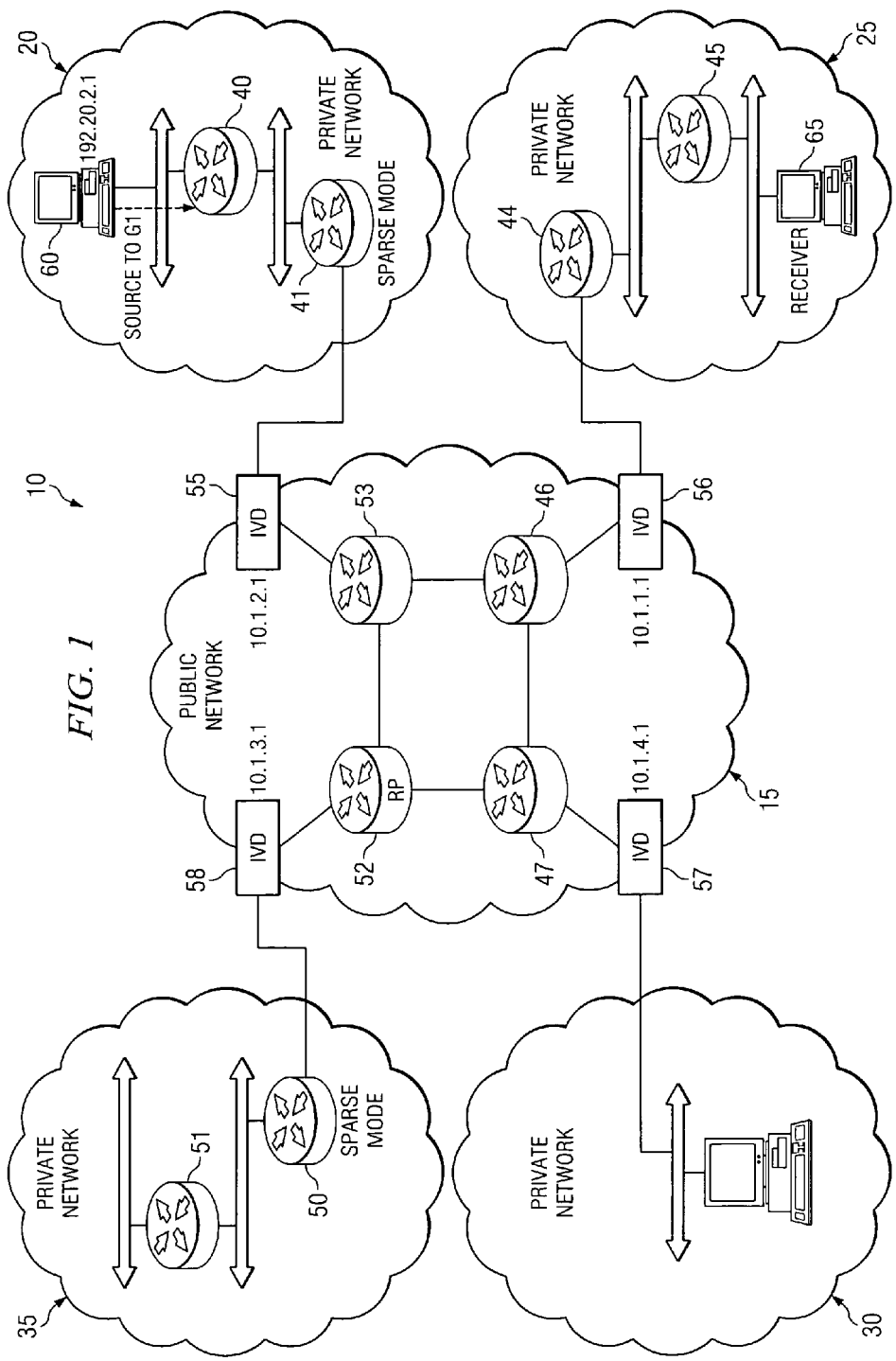
FIG. 1 is a simplified block diagram of a communications environment in which the present invention may be practiced.

FIG. 1 is a simplified diagram of an exemplary communication system 10 in which the present invention may be practiced. Communication system 10 may include an unsecured public network 15 and one or more secured private networks, such as secured private networks 20-35. Note that the term "public network" is used herein interchangeably with "unsecured network." Both terms refer to a broad concept of a network that provides open access to network resources, with little or no access controls. The Internet is one example of such a network. In contrast, the terms "private network" and "secured network" refer broadly to networks that implement access controls, restricting access to a finite set of authorized users. Many corporate intranets and military networks are secured networks. Referring again to FIG. 1 for illustration, public network 15 and each of secured private networks 20-35 generally include a variety of network elements, such as network elements 41-58. FIG. 1 generally may be configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 also may operate in conjunction with a user datagram protocol/IP (UDP/IP) or any other suitable protocol where appropriate.

Communication system 10 is also operable to support multicasting, in which a single multicast source may transmit data to many multicast receivers. Accordingly, FIG. 1 also illustrates a multicast source element (MSE) 60 and a multicast receiver element (MRE) 65 in communication system 10. More particularly, MSE 60 is coupled to private network 20 and MRE 65 is coupled to private network 25. In one example, MSE 60 is illustrated as having a network address of 192.20.2.1.

Network elements 41-53 are multicast routers in the example embodiment of FIG. 1; however, network elements 41-53 may be any other suitable device where appropriate and in accordance with particular needs. For example, network elements 41-53 may be switches, gateways, bridges, load-balancers, firewalls, or any other suitable device, component, element, or object operable to exchange information associated with awareness in a network environment. In addition, network elements 41-53 may include any suitable hardware, software, components, modules, interfaces, or objects that facilitate the operations thereof. This may be inclusive of appropriate algorithms and communication protocols that allow for the effective exchange of data or information.

In alternative embodiments, network elements 41-53 may use any suitable discovery means that operate to indicate the presence or absence of surrounding or adjacent network elements. Note that the terms "adjacent" and "surrounding" reflect broad terminology that may be used interchangeably herein. These terms connote an idea of awareness, as it relates to any component, device, or element that can be reached by a given network element 41-53.

One example of a discovery means is the exchange of "discovery packets." As used herein, the term "discovery packet" refers to and encompasses any data packet used to establish and maintain relationships between adjacent network elements ("neighbors"), including protocol Hello packets.

Routers typically transmit protocol Hello packets periodically to establish and maintain neighbor relationships. A protocol Hello packet is a common mechanism for exchanging information that reflects the most recent appearance (presence) or absence of adjacent network elements. Protocol Hello packets generally include various types of information, such as a list of known neighbors on a given link. Through Hello packets, each network element can establish whether or not two-way connectivity exists between itself and adjacent elements. Neighbor adjacency also is the basis for routing other messages, including service information and other types of protocol control messages, between network elements.

For purposes of teaching, it is important to understand the concepts of a multicast group and group management in a multicast application. A multicast group comprises an arbitrary collection of devices that express an interest in receiving a particular data stream from one or more source devices. Such a group does not have any physical or geographical boundaries. The devices can be located anywhere on a network. An individual member of a multicast group is referred to herein as a "multicast receiver element" (MRE) or a "receiver."

Devices that are interested in receiving data flowing to a particular multicast group must join the group expressly by sending a "membership report" (also sometimes colloquially referred to as a "join message"). Although devices may use any acceptable protocol to exchange membership reports, one embodiment of the present invention implements the Internet Group Management Protocol (IGMP) to dynamically register receivers in a multicast group. Receivers identify group membership by sending IGMP messages to an adjacent multicast router.

Multicast routers, in turn, create distribution trees that control the path that multicast traffic takes through the network to deliver traffic to all receivers. There are two basic types of multicast distribution trees: source trees and shared trees.

Arguably the simplest form of a multicast distribution tree is a source tree whose root is the source of the multicast tree and whose branches form a spanning tree through the network to the receivers. Because this tree uses the shortest path through the network, it is also referred to as a "shortest path tree" (SPT). A separate SPT exists for each individual source sending to each group.

Unlike source trees that have their root at the source, shared trees use a single common root placed at some chosen point in the network. This shared root is commonly referred to as the "rendezvous point" (RP). When using a shared tree, sources must send their traffic to the RP, and then the traffic is forwarded down the shared tree to reach all receivers.

SPTs generally have the advantage of creating the optimal path between the source and the receivers, which guarantees the minimum amount of network latency for forwarding multicast traffic. Routers in SPTs, however, must maintain path information for each source, which can quickly become a resource issue on the routers.

In contrast, shared trees typically have the advantage of requiring the minimum amount of state in each router. This lowers the overall memory requirements for a network that allows only shared trees. The disadvantage of shared trees, though, is that the paths between the source and receivers may not be the optimal path in all circumstances.

To create distribution trees, multicast routers exchange state information with each other through various types of control messages. A multicast control message often includes information that is similar to the information found in a membership report, but formatted for a particular multicast protocol. Accordingly, such control messages also are frequently referred to in the art as "join messages." As noted above, however, membership reports also may be referred to informally as join messages. Thus, for the sake of clarity, the term "membership report" will be used herein to refer to any join message generated by a receiver, while the term "control message" or "multicast control message" will be used to refer to any message or packet generated by a multicast router. The more generic term "join message" will be used in contexts where the source of the message or packet could be either a receiver or a multicast router.

In one embodiment of the present invention, multicast routers 41-53 implement protocol-independent multicast (PIM) to exchange information, including Hello packets and multicast control messages. PIM can leverage any unicast routing protocol used to populate the unicast routing table. PIM uses this unicast routing information to perform the multicast forwarding function. Although PIM is called a multicast routing protocol, it actually uses the unicast routing table to perform a reverse path forwarding (RPF) check function, instead of building a completely independent multicast routing table.

Network elements 55-58 in the exemplary embodiment of FIG. 1 are encryptor network elements (referred to herein as "encryptors"). Although depicted as distinct devices in FIG. 1, network elements 55-58 may be integrated into other network elements, including routers, switches, gateways, bridges, load-balancers, firewalls, or any other similar device. Additionally, network elements 55-58 may include any appropriate software, algorithms, or hardware to facilitate their operations.

As depicted in the example embodiment of FIG. 1, an encryptor network element is coupled to both a private network and a public network. An encryptor network element encrypts and decrypts traffic passing between private and public networks. In one embodiment of the present invention, encryptor network elements 55-58 implement the IPSec protocol to create secure tunnels between two private networks, such as private network 20 and private network 25. Two or more private networks coupled by a secure tunnel constitute a virtual private network (VPN). Accordingly, in an embodiment that implements IPSec, encryptor network elements 55-58 are referred to as IPSec VPN devices (IVDs) 55-58.

As described in greater detail below, IVDs 55-58 overcome the disadvantages and problems associated with conventional multicast VPN technology by generating membership reports and, further, by tunneling multicast control messages between private networks.

In one embodiment of the present invention, an IVD also serves as a proxy for discovery packets between a public network and a private network. Such an IVD receives and regenerates packets from routers in a private network. FIG. 2 is a simplified diagram of such an embodiment. In FIG. 2, IVD 56 receives Hello packets, such as Hello packet 200, and generates a second Hello packet 250. IVD 56 then transmits second Hello packet 250 to multicast router 46 in public network 15. Thus, to routers in public network 15, IVD 56 appears to be another multicast router. Hello packets, such as Hello packet 200 and Hello packet 250 generally include a destination field 205, a source field 210, and Hello options 215. IVD 56 rewrites source field 210 before transmitting Hello packet 250 to public network 15, thus masking the private address of router 44. More specifically, IVD 56 inserts its own network address into source field 210 so that adjacent multicast routers in public network 15 will forward multicast traffic to IVD 56.

FIG. 3 is a simplified block diagram of an embodiment of the present invention in which a network element is acting as a proxy for protocol Hello packets. As FIG. 3 illustrates, IVD 56 also can serve as a proxy for Hello packets traveling in the opposite direction—from public network 15 to private network 25.

In certain embodiments of the present invention, the Hello proxy function illustrated in FIG. 2 and FIG. 3 facilitates communication of protocol and other service messages between and across public and private networks.

Figure 4B:
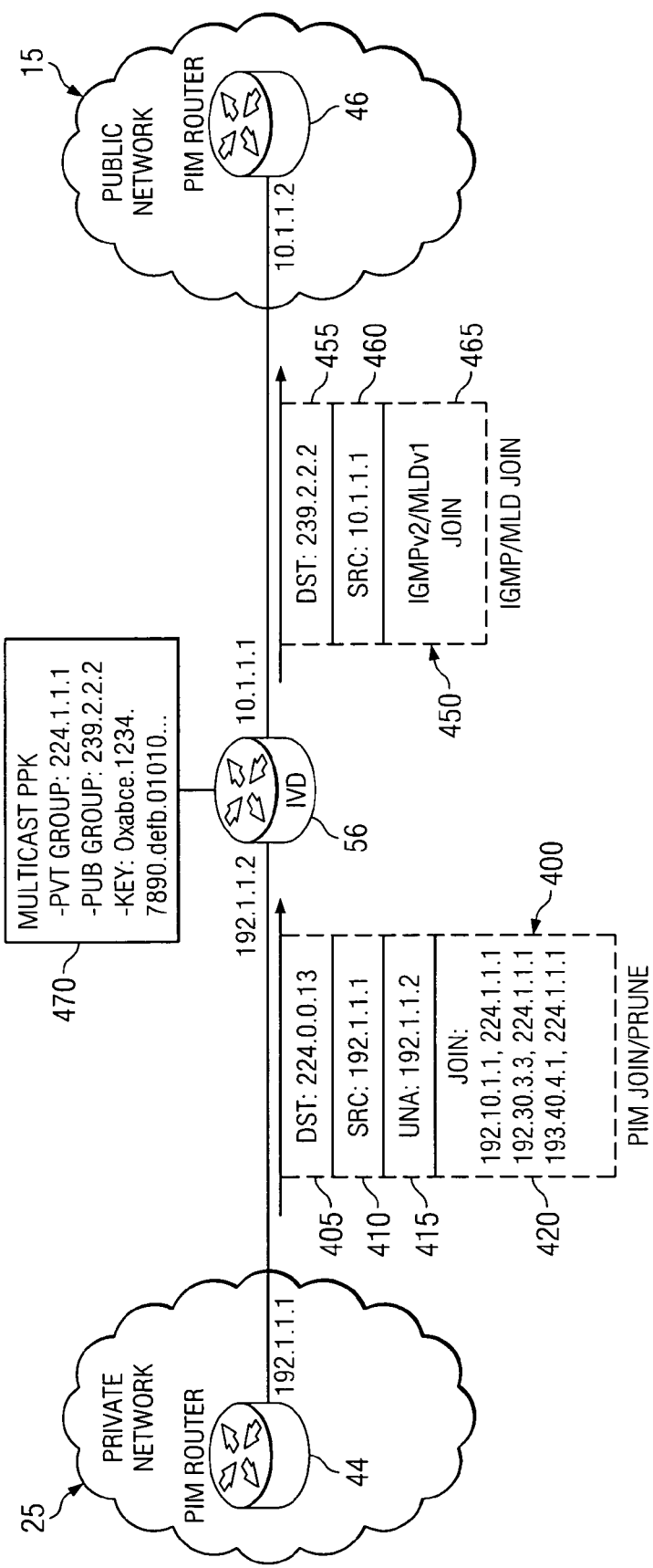
FIG. 4-A is a simplified block diagram of an embodiment of the present invention in which a network element is acting as a proxy source.

FIG. 4-A is a simplified block diagram of an embodiment of the present invention in which a network element is acting as a proxy source. An IVD that receives a multicast packet from an MSE in a private network and transmits a corresponding multicast packet into a public network appears to be a source to multicast routers in the public network.

As FIG. 4-A illustrates, IVD 55 receives multicast packet 402 that originates from MSE 60. In this example, multicast packet 402 is destined for a private multicast group having an address of 224.1.1.1. To generate a corresponding multicast packet for transmission into the public network, IVD 55 maintains a table of multicast pre-placed keys (PPKs), such as table 470, which maps private multicast groups to public multicast groups. An encryption key also is associated with each mapping in table 470. When IVD 55 receives multicast packet 402, IVD 55 attempts to match the private multicast group address with an entry in table 470. If IVD 55 finds a match, then IVD 55 maps the private multicast group address (i.e. 224.1.1.1) to the corresponding public multicast group address. In this example, the public multicast group address is 239.2.2.2. IVD 55 then creates multicast packet 404 and inserts the public multicast group address into the destination field. Next, IVD 55 encrypts multicast packet 402 (including the original private multicast group address) and inserts the entire encrypted packet into the payload field of multicast packet 404. Finally, IVD 55 transmits multicast packet 404 into the public network.

FIG. 4-B is a simplified block diagram of an embodiment of the present invention in which a network element is acting as a proxy receiver. An IVD that regenerates membership reports from a device in a private network appears to be a receiver to multicast routers in a public network, as illustrated in the simplified diagram of FIG. 4-B. In FIG. 4-B, the device is a multicast router that transmits multicast control messages, but also could be a receiver that transmits membership reports. In such an embodiment of the present invention, an IVD functions as a proxy receiver. As FIG. 4-B illustrates, IVD 56 receives a multicast control message from private router 44 in private network 25. In this example, private router 44 transmits multicast control message 400 through a network interface that has a network address of 192.1.1.1, and IVD 56 receives control message 400 through interface 192.1.1.2. Control message 400 typically comprises a destination address field 405, a source address field 410, an upstream neighbor address field (UNA) 415, and a group list 420. In the example of FIG. 4-B, control message 400 is a PIM control message. UNA 415 specifies the address of the multicast router for which multicast control message 400 is destined, which in FIG. 4-B is the network address of IVD 56 (192.1.1.2). Group list 420 includes a list of sources to join.

As shown in FIG. 4-B, a membership report 450 typically comprises a destination field 455, a source field 460, and join message 465. To generate membership report 450 from multicast control message 400, IVD 56 examines group list 420 to identify groups. In control message 400, the groups are private addresses. In the example of FIG. 4-B, IVD 56 identifies the private group address 224.1.1.1, and three sources (192.10.1.1; 192.30.3.3; and 192.40.4.1) in that group. If the private group address has an associated multicast PPK, as in table 470, then IVD 56 maps the private group address to a public group address associated with the multicast PPK. IVD 56 then inserts the public group address into destination field 455 of the membership report 450, and inserts its own address into the source field 460. In the example illustrated in FIG. 4-B, IVD 56 maps private group address 224.1.1.1 to public group address 239.2.2.2. Thus, the original private network information is removed before the message is sent into the public network. In one embodiment of the present invention, IVD 56 maintains a table of joined groups and periodically sends out updates.

Figure 5:
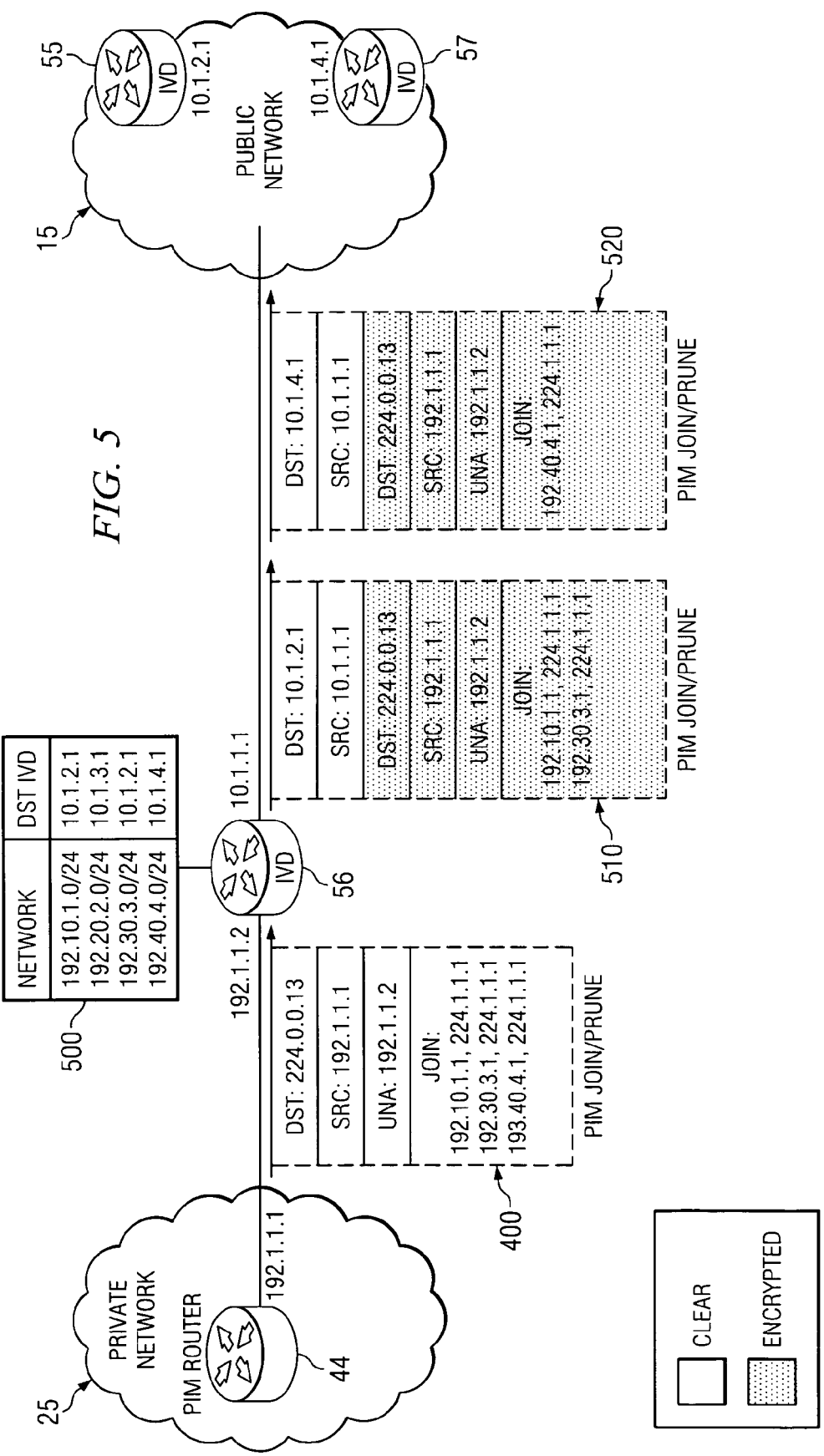
FIG. 5 is an illustration of an embodiment of the control message tunneling feature of the present invention.

FIG. 5 illustrates an embodiment of the control message tunneling feature of the present invention. After receiving control message 400 from private router 44, IVD 56 compares the network addresses in group list 420 with the network addresses in tunnel table 500. Tunnel table 500 represents any collection of data that links a private network interface to a remote network interface (usually a public network interface). Tunnel table 500 may be integrated into the memory of IVD 56, or may be stored in any memory (or other non-transitory computer readable storage medium) or storage device accessible to IVD 56. In general, the purpose of comparing the network addresses in group list 420 with tunnel table 500 is to identify distinct network interfaces that are linked to the network addresses in group list 420. Once IVD 56 determines the number of distinct network interfaces, IVD 56 builds a new control message for each distinct network interface. In the example embodiment illustrated in FIG. 5, tunnel table 500 links addresses on the 192.10.1.0 and 192.30.3.0 subnets to a remote network interface having an address of 10.1.2.1, and addresses on the 193.40.4.0 subnet to a remote network interface having an address of 10.1.4.1. In this example, each of the remote network interfaces is coupled to an IVD (IVD 55 and IVD 57). Accordingly, IVD 56 creates two new control messages, control message 510, and control message 520. IVD 56 encrypts all original, private network information, and rewrites the destination and source fields. For example, IVD 56 inserts into the destination field of control message 510 the remote network interface address 10.1.2.1, which is linked to subnets 192.10.1.0 and 192.30.3.0. Similarly, IVD 56 inserts into the destination field of control message 520 the remote network interface address 10.1.4.1, which is linked to subnet 192.40.4.0. IVD 56 inserts its own public network address (10.1.1.1 in FIG. 5) into the source field of both control messages 510 and 520.

Figure 6:
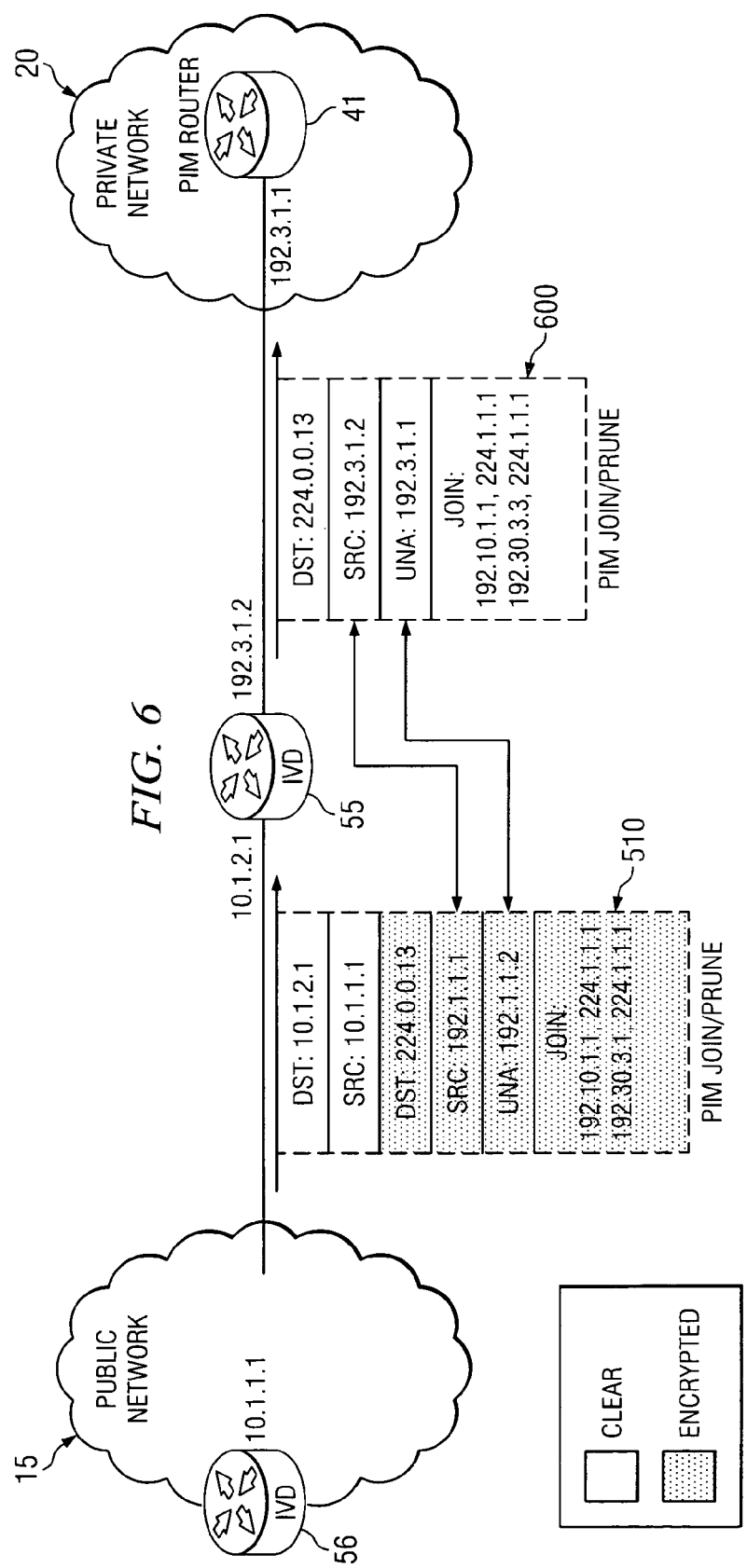
FIG. 6 illustrates an embodiment of the control message tunneling feature of the present invention from the perspective of a receiving network element.

FIG. 6 is a simplified block diagram that illustrates this tunneling feature from the perspective of the receiving network element, which is represented by IVD 55 in FIG. 6. In FIG. 6, IVD 55 receives control message 510, decrypts control message 510, and inserts the decrypted control message into control message 600. IVD 55 then rewrites the destination, source, and UNA fields in control message 600 before forwarding it to private router 41 in private network 20.

Figure 7A:
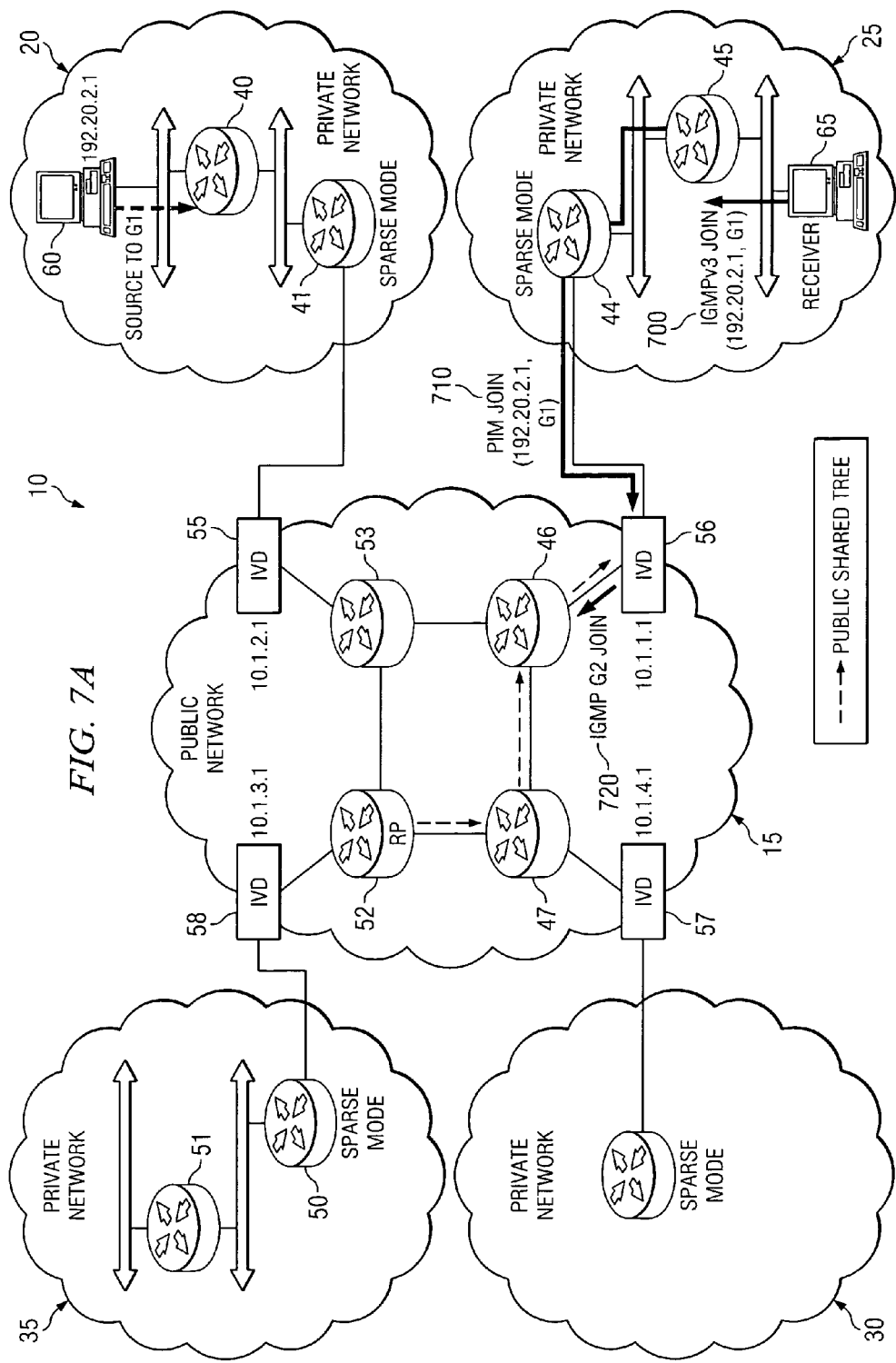

FIGS. 7A through 7E illustrate (at various stages of operation) an example of communication system 10 in which features of the present invention are embodied in IVDs 55 and 56. FIG. 7A illustrates a flow in which MRE 65 has transmitted a membership report 700 to private router 45, indicating that MRE 65 wants to receive a data stream from MSE 60 in a multicast group denoted as G1. Private router 45, in turn sends a control message to private router 44. Control message comprises a group list that includes the network address of MSE 60 and G1. Private router 44 then forwards or regenerates the control message as control message 710. As illustrated in FIG. 7A, IVD 56 eventually receives control message 710. FIG. 7A further illustrates IVD 56 regenerating a membership report 720 and forwarding membership report 720 to public router 46, substantially as described above with reference to FIG. 4-B. Public routers 46, 47, 52, and 53 then build a multicast distribution tree between public router 52 (which is designated as a rendezvous point in the example) and IVD 56.

Figure 7B:
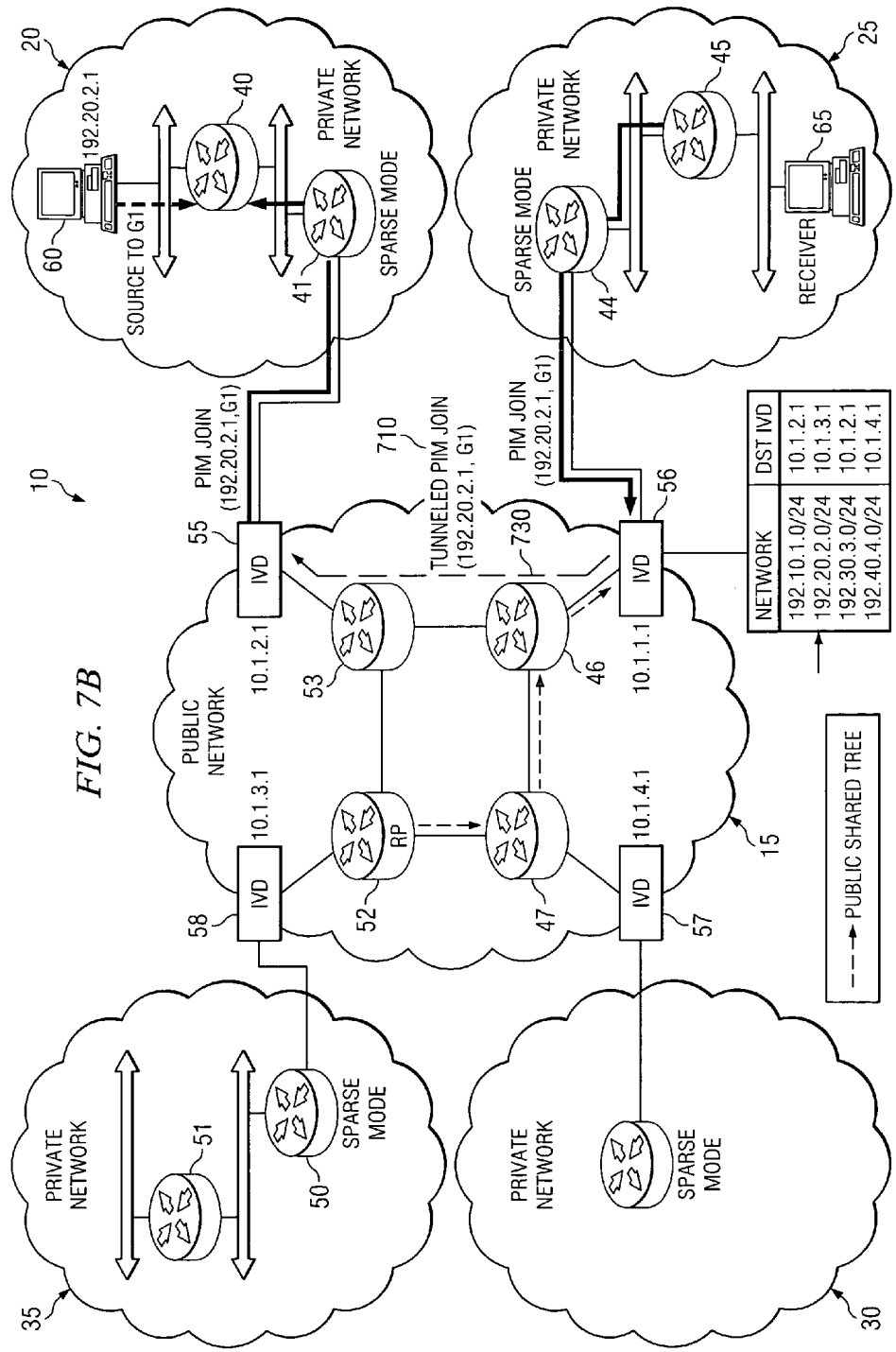

Continuing with FIG. 7B, IVD 56 creates a secure tunnel connection 730 across public network 15 to IVD 55, substantially as described above with reference to FIG. 5. IVD 56 then sends control message 710 to IVD 55 through tunnel connection 730. Control message 710 is then routed through private routers 40 and 41 in private network 20.

Continuing with FIG. 7C, IVD 55, private router 40, and private router 41 operate in concert to build a multicast distribution tree for G1 between MSE 60 and IVD 55. Likewise, IVD 56, private router 44, and private router 45 operate in concert to build a multicast distribution tree for G1 between IVD 56 and MRE 65.

Figure 7D:
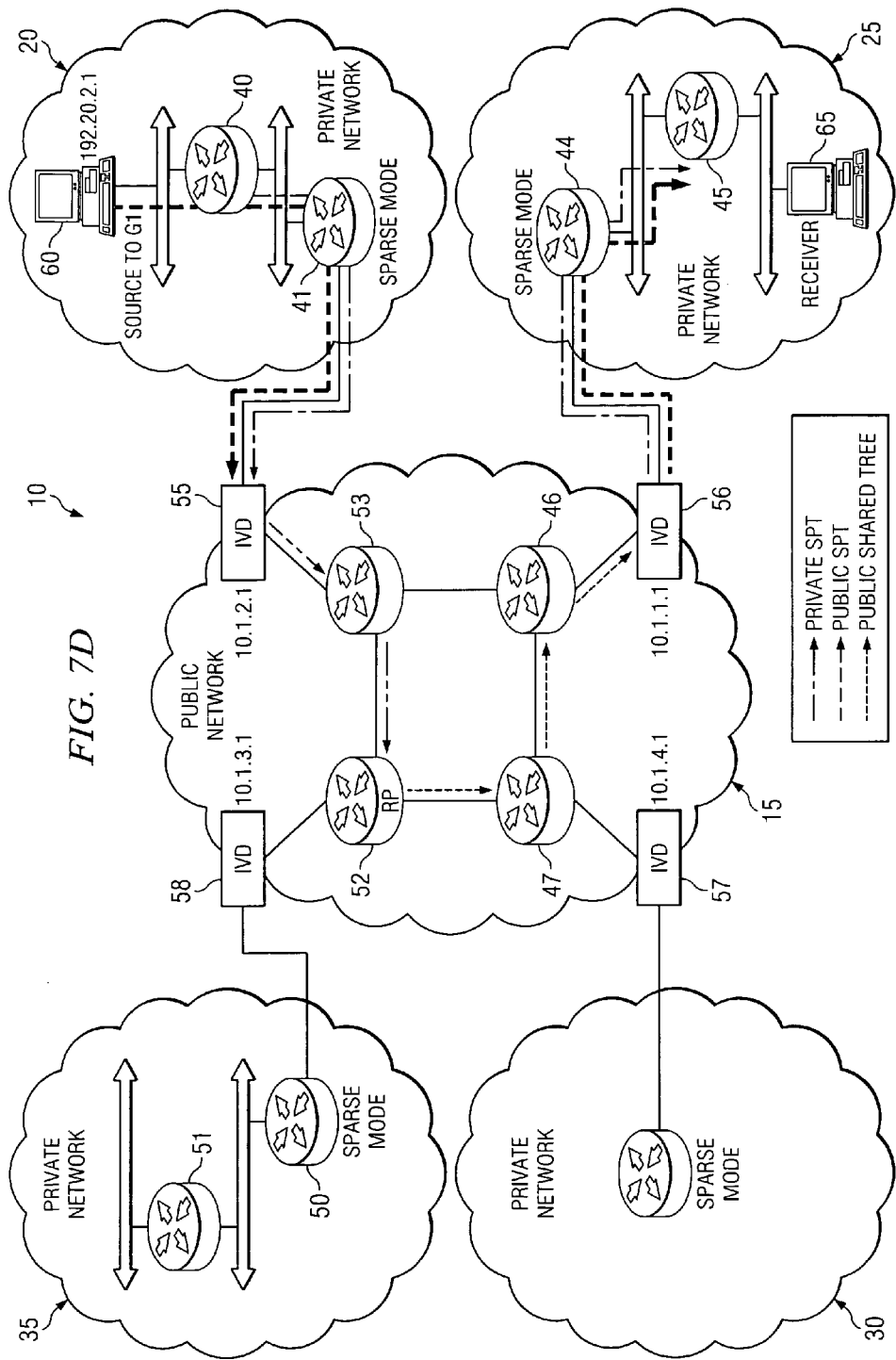

Continuing with FIG. 7D, IVD 55 and public routers in public network 15 operate to build a multicast distribution tree between IVD 55 and the rendezvous point, public router 52, thus completing a distribution tree between MSE 60 and MRE 65.

Figure 7E:
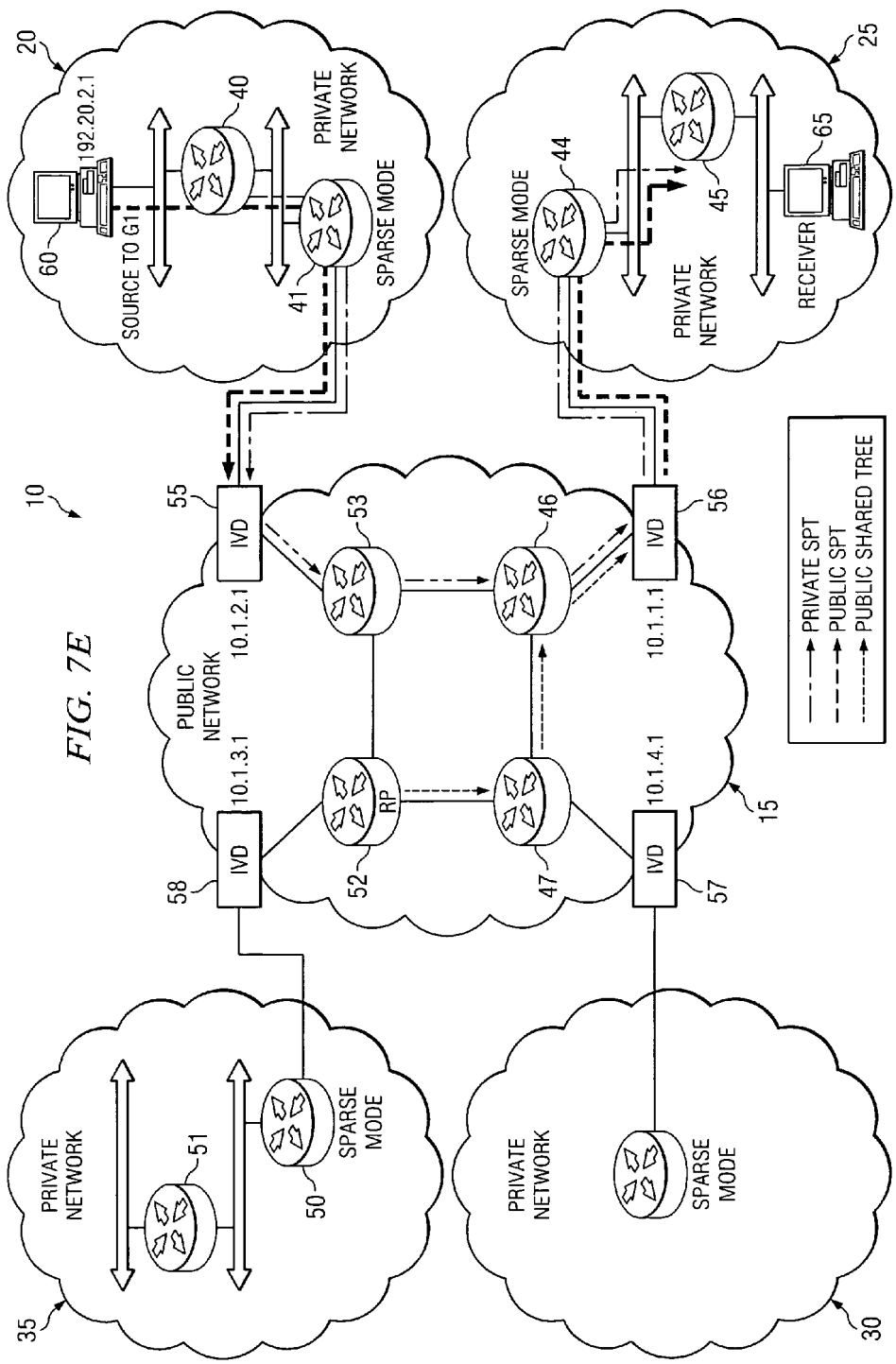

With such a distribution tree complete, FIG. 7E illustrates how public routers in public network 15 operate with IVD 55 and IVD 56 to optimize the distribution tree between IVD 55 and IVD 56. In the example of FIG. 7E, the distribution tree is modified to create an SPT between IVD 55 and IVD 56.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing a secure multicast of data across an unsecured network, the method comprising:

receiving, at an IPSec virtual private network device (IVD), a join message identifying at least one private multicast group;

identifying, by the IVD, a public multicast group of the unsecured network that is mapped to the private multicast group;

generating, by the IVD, a membership report specifying the public multicast group;

inserting a public IVD address of the IVD into a source field of the membership report;

sending the membership report to the unsecured network;
creating an IPSec tunnel through the unsecured network to a network element;
generating an IPSec encrypted control message specifying the private multicast group; and
sending the encrypted control message through the tunnel to allow the network element to decrypt the encrypted control message and send the decrypted control message to another network element.

2. The method of claim 1, wherein the join message is a control message.

3. The method of claim 2, wherein the control message is a Protocol Independent Multicast control message.

4. The method of claim 1, wherein the join message is a membership report.

5. The method of claim 4, wherein the membership report is an Internet Group Message Protocol membership report.

6. The method of claim 1, wherein the network element is an encryption device.

7. The method of claim 1, further comprising:
receiving the encrypted control message from the secure tunnel;
decrypting the encrypted control message; and
sending the decrypted control message to a second network element.

8. A system for securely transmitting multicast data across a public network, the system comprising:
a first encryptor network element comprising an IPSec virtual private network device (IVD) and operable to
receive a join message from a first network element, the join message identifying at least one private multicast group,
identify a public multicast group of the unsecured network that is mapped to the private multicast group,
generate a membership report specifying the public multicast group,
send the membership report to the public network,
generate an IPSec encrypted control message specifying the private multicast group,
insert a public IVD address of the IVD into a source field of the membership report,
send the encrypted control message through the secure tunnel to the second encryptor network element to allow the second encryptor network element to decrypt the encrypted control message and send the decrypted control message to another network element.

9. The system of claim 8, wherein the first network element is selected from a group consisting of:
a router;
a switch;
a gateway;
a bridge;
a load-balancer; and
a firewall.

10. The system of claim 8, wherein the join message is a control message.

11. The system of claim 10, wherein the control message is a Protocol Independent Multicast control message.

12. The system of claim 8, wherein the first network element is a multicast receiver.

13. The system of claim 12, wherein the join message is a membership report.

14. The system of claim 13, wherein the membership report is an Internet Group Message Protocol membership report.

15. A non-transitory computer readable medium storing software for securely transmitting multicast data across a public network, the software being embodied in the non-transitory computer readable medium and comprising code such that when executed is operable to:
receive a join message identifying at least one private multicast group;
identify a public multicast group of the unsecured network that is mapped to the private multicast group;
generate a membership report specifying the public multicast group;
insert a public IVD address of the IVD into a source field of the membership report;
send the membership report to the unsecured network;
create an IPSec tunnel through the unsecured network to a network element;
generate an IPSec encrypted control message specifying the private multicast group; and
send the encrypted control message through the tunnel to allow the network element to decrypt the encrypted control message and send the decrypted control message to another network element.

16. The non-transitory computer readable medium of claim 15, wherein the join message is a control message.

17. The non-transitory computer readable Medium of claim 16, wherein the control message is a Protocol Independent Multicast control message.

18. The non-transitory computer readable medium of claim 15, wherein the join message is a membership report.

19. The non-transitory computer readable medium of claim 18, wherein the membership report is an Internet Group Message Protocol membership report.

20. The non-transitory computer readable medium of claim 15, wherein the network element is an encryption device.

\* \* \* \* \*

UNITED STATES PATENT AND TRADEMARK OFFICE
CERTIFICATE OF CORRECTION

| | |
|---|---|
| PATENT NO. | : 8,037,303 B2 |
| APPLICATION NO. | : 11/374645 |
| DATED | : October 11, 2011 |
| INVENTOR(S) | : Gary Beau Williamson |

It is certified that error appears in the above-identified patent and that said Letters Patent is hereby corrected as shown below:

Col. 9, Ln. 35: After "public network" insert -- create an IPSec secure tunnel to a second encryptor network element, --

Signed and Sealed this
Thirteenth Day of December, 2011

David J. Kappos
*Director of the United States Patent and Trademark Office*